United States Patent
Seacat DeLuca et al.

(10) Patent No.: US 10,956,001 B2
(45) Date of Patent: *Mar. 23, 2021

(54) PROGRESS BAR UPDATED BASED ON CROWD SOURCED STATISTICS

(71) Applicant: International Business Machines Corporation, Armonk, NY (US)

(72) Inventors: Lisa Seacat DeLuca, Baltimore, MD (US); Clifford A. Pickover, Yorktown Heights, NY (US); Dana L. Price, Surf City, NC (US); Aaron J. Quirk, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/377,159

(22) Filed: Apr. 6, 2019

(65) Prior Publication Data

US 2019/0235717 A1 Aug. 1, 2019

Related U.S. Application Data

(63) Continuation of application No. 14/953,474, filed on Nov. 30, 2015, now Pat. No. 10,289,281.

(51) Int. Cl.
*G06F 3/0484* (2013.01)
*G06F 3/0481* (2013.01)

(52) U.S. Cl.
CPC .......... *G06F 3/0484* (2013.01); *G06F 3/0481* (2013.01)

(58) Field of Classification Search
CPC ......... G06F 3/0484; G06F 3/0481; G06F 9/46
See application file for complete search history.

(56) References Cited

U.S. PATENT DOCUMENTS 6,275,987 B1 * 8/2001 Fraley ................ G06F 3/04847
714/E11.195
7,448,019 B2 11/2008 Kovacs
(Continued)

FOREIGN PATENT DOCUMENTS

| CN | 103631571 A | 3/2014 |
|---|---|---|
| CN | 104123214 A | 10/2014 |
| CN | 104346518 A | 2/2015 |

OTHER PUBLICATIONS

IBM: List of IBM Patents of Patent Applications Treated as Related, 2 pg.

(Continued)

*Primary Examiner* — Phenuel S Salomon
(74) *Attorney, Agent, or Firm* — Cuenot, Forsythe & Kim, LLC

(57) ABSTRACT

First statistical data and at least second statistical data can be received from respective data processing systems, the statistical data received from each data processing system indicating a respective duration of time for the data processing system to perform a task. A progress profile for the task can be updated by conglomerating the first statistical data with at least the second statistical data. A request indicating the task can be received from a third data processing system. In response, the progress profile can be communicated to the third data processing system. The third data processing system can present on a display a progress bar and indicate status of completion of the task by reiteratively updating the progress bar. The status of completion can be determined based on a duration of time expected for the task indicated in the progress profile and an amount of time that has elapsed.

20 Claims, 4 Drawing Sheets

(56) References Cited

U.S. PATENT DOCUMENTS

| | | | | |
|---|---|---|---|---|
| 8,121,874 B1* | 2/2012 | Guheen | ................ | G06Q 10/063 705/7.11 |
| 9,652,108 B2* | 5/2017 | Mountain | ........ | H04N 21/44245 |
| 10,289,281 B2 | 5/2019 | Deluca et al. | | |
| 2003/0217053 A1* | 11/2003 | Bachman | ......... | G05B 19/41865 |
| 2008/0256474 A1* | 10/2008 | Chakra | ................ | G06F 3/0481 715/772 |
| 2008/0270928 A1* | 10/2008 | Chakra | ............... | G06F 11/3664 715/772 |
| 2009/0070699 A1 | 3/2009 | Birkill et al. | | |
| 2009/0113334 A1* | 4/2009 | Chakra | ................... | G06F 9/451 715/772 |
| 2010/0083159 A1* | 4/2010 | Mountain | ............. | G06F 11/324 715/772 |
| 2011/0055881 A1* | 3/2011 | Yu | ..................... | H04N 21/2387 725/88 |
| 2012/0243027 A1 | 9/2012 | Waller et al. | | |
| 2012/0265573 A1* | 10/2012 | Van Pelt | .......... | G06Q 10/06311 705/7.14 |
| 2013/0144679 A1* | 6/2013 | Burnett | ........... | G06Q 10/06313 705/7.27 |
| 2013/0204652 A1* | 8/2013 | Marins | ................... | G06Q 30/02 705/7.15 |
| 2013/0231969 A1* | 9/2013 | Van Pelt | .......... | G06Q 10/06311 705/7.13 |
| 2013/0235044 A1 | 9/2013 | Kaleta et al. | | |
| 2013/0346986 A1* | 12/2013 | Goetz | ..................... | G06F 9/485 718/102 |
| 2014/0019202 A1 | 1/2014 | Mamic et al. | | |
| 2014/0258910 A1 | 9/2014 | Liang et al. | | |
| 2014/0380179 A1 | 12/2014 | Bose et al. | | |
| 2016/0196511 A1* | 7/2016 | Anisingaraju | ......... | G06Q 50/01 705/7.11 |
| 2017/0026441 A1* | 1/2017 | Moudy | ................ | G06F 9/5027 |
| 2017/0153779 A1 | 6/2017 | Seacat Deluca et al. | | |
| 2017/0236221 A1* | 8/2017 | Davidson | ............... | G06Q 50/04 705/7.23 |

OTHER PUBLICATIONS

Deluca et al., "Progress Bar Updated Based on Crowd Sourced Statistics", U.S. Appl. No. 14/953,474, filed Nov. 30, 2015, 31 pages (A copy is not proviced as this application is available to the Examiner.

* cited by examiner

300

┌─────────────────────────────────────────────────────────────┐
│ Detect a task being initiated by a first data processing system comprising at least one processor │
│ 305 │
└─────────────────────────────────────────────────────────────┘
                              ▼
┌─────────────────────────────────────────────────────────────┐
│ Responsive to detecting the task being initiated, access, by the first data processing system via a communication network, a progress profile at least indicating a duration of time expected for the task to be performed, wherein the progress profile is generated based on crowd sourced statistics indicating respective durations of time to perform the task by a plurality of other data processing systems that performed the task and that shared the respective durations of time with a second data processing system for inclusion in the crowd sourced statistics │
│ 310 │
└─────────────────────────────────────────────────────────────┘
                              ▼
┌─────────────────────────────────────────────────────────────┐
│ Present on a display, by the first data processing system, a progress bar │
│ 315 │
└─────────────────────────────────────────────────────────────┘
                              ▼
┌─────────────────────────────────────────────────────────────┐
│ Indicate a status of completion of performing the task by the first data processing system by reiteratively updating the progress bar, wherein the status of completion of performing the task by the first data processing system is determined based on the duration of time expected for the task to be performed as indicated in the progress profile and an amount of time that has elapsed since the task was initiated or a number of processes to performed by the task that are completed │
│ 320 │
└─────────────────────────────────────────────────────────────┘

FIG. 3

PROGRESS BAR UPDATED BASED ON CROWD SOURCED STATISTICS

BACKGROUND

The present invention relates to data processing systems, and more specifically, to progress bars displayed by data processing systems.

A progress bar is a graphical control element used to visually depict a progression of a task being performed by a data processing system, such as a computer. Examples of such a task may include performing a download, performing a file transfer, performing a software installation, and the like. Sometimes, the graphical control element is accompanied by a textual representation of the progress of performance of the task, for example in a percent format. Many computer users find progress bars helpful. For example, while an extended computer operation is being performed, movement of the progress bar can indicate that the computer still is operating and has not become unresponsive due to an error.

SUMMARY

A method includes receiving from a first data processing system first statistical task data, the first statistical task data including at least one statistic indicating a first duration of time to perform a task by the first data processing system that performed the task. The method also can include receiving from a second data processing system second statistical task data, the second statistical task data including at least one statistic indicating a second duration of time to perform the task by the second data processing system that performed the task. The method also can include updating, using a processor, a progress profile for the task by conglomerating the first statistical task data received from the first data processing system with at least the second statistical task data received from the second data processing system, the progress profile indicating the task, the first duration of time to perform the task by first data processing system and at least the second duration of time to perform the task by the second data processing system. The method also can include receiving a request from a third data processing system, the request indicating the task. The method also can include, responsive to receiving the request from the third data processing system, communicating to the third data processing system the progress profile, wherein the third data processing system presents on a display a progress bar and indicates a status of completion of performing the task by the first data processing system by reiteratively updating the progress bar, wherein the status of completion of performing the task by the third data processing system is determined based on a duration of time expected for the task to be performed as indicated in the progress profile and an amount of time that has elapsed since the task was initiated.

A system includes a processor programmed to initiate executable operations. The executable operations include receiving from a first data processing system first statistical task data, the first statistical task data including at least one statistic indicating a first duration of time to perform a task by the first data processing system that performed the task. The executable operations also can include receiving from a second data processing system second statistical task data, the second statistical task data including at least one statistic indicating a second duration of time to perform the task by the second data processing system that performed the task. The executable operations also can include updating a progress profile for the task by conglomerating the first statistical task data received from the first data processing system with at least the second statistical task data received from the second data processing system, the progress profile indicating the task, the first duration of time to perform the task by first data processing system and at least the second duration of time to perform the task by the second data processing system. The executable operations also can include receiving a request from a third data processing system, the request indicating the task. The executable operations also can include, responsive to receiving the request from the third data processing system, communicating to the third data processing system the progress profile, wherein the third data processing system presents on a display a progress bar and indicates a status of completion of performing the task by the first data processing system by reiteratively updating the progress bar, wherein the status of completion of performing the task by the third data processing system is determined based on a duration of time expected for the task to be performed as indicated in the progress profile and an amount of time that has elapsed since the task was initiated.

A computer program product includes a computer readable storage medium having program code stored thereon. The program code is executable by a data processing system to initiate operations. The operations include receiving from a first data processing system first statistical task data, the first statistical task data including at least one statistic indicating a first duration of time to perform a task by the first data processing system that performed the task. The operations also can include receiving from a second data processing system second statistical task data, the second statistical task data including at least one statistic indicating a second duration of time to perform the task by the second data processing system that performed the task. The operations also can include updating a progress profile for the task by conglomerating the first statistical task data received from the first data processing system with at least the second statistical task data received from the second data processing system, the progress profile indicating the task, the first duration of time to perform the task by first data processing system and at least the second duration of time to perform the task by the second data processing system. The operations also can include receiving a request from a third data processing system, the request indicating the task. The operations also can include, responsive to receiving the request from the third data processing system, communicating to the third data processing system the progress profile, wherein the third data processing system presents on a display a progress bar and indicates a status of completion of performing the task by the first data processing system by reiteratively updating the progress bar, wherein the status of completion of performing the task by the third data processing system is determined based on a duration of time expected for the task to be performed as indicated in the progress profile and an amount of time that has elapsed since the task was initiated.

BRIEF DESCRIPTION OF THE DRAWINGS

FIG. 3 is a flow chart illustrating an example of a method of presenting and reiteratively updating a progress bar.

DETAILED DESCRIPTION

Figure 1:
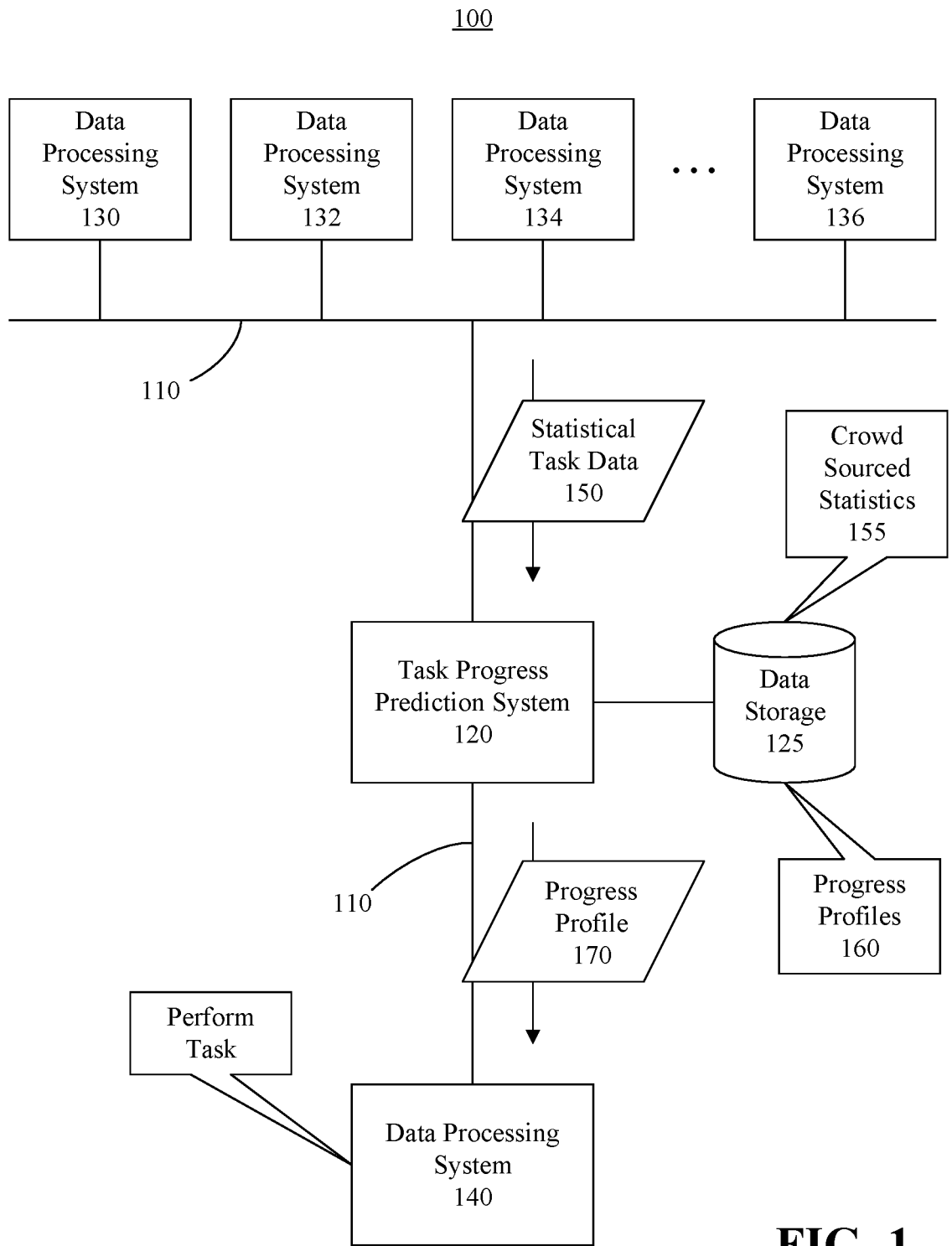
FIG. 1 is a block diagram illustrating an example of a network data processing system.

This disclosure relates to data processing systems, and more specifically, to progress bars displayed by data processing systems. In accordance with the inventive arrangements disclosed herein, crowd sourced statistics pertaining to times to perform various tasks on various data processing systems, and the hardware/software environments of the respective data processing systems, can be gathered from a large number of disparate data processing systems. The crowd source statistics can be processed and consolidated to generate progress profiles. Each progress profile can indicate an expected duration of time expected for a particular task to be performed on data processing systems having particular hardware/software environments.

Responsive to a task being initiated on a another data processing system, the data processing system can access a progress profile that corresponds to the task and the hardware/software environment of the data processing system. The data processing system also can present a progress bar to a user. The data processing system can reiteratively update the progress bar, based on data contained in the progress profile, to provide an accurate indication of task completion and/or of time remaining for a task to be completed.

Several definitions that apply throughout this document now will be presented.

As defined herein, the term "progress bar" means a graphical control element used to visually depict a progression of a task being performed by a data processing system. Such a task may include, but is not limited to, performing a download, performing a file transfer, performing a software installation, and the like.

As defined herein, the term "task" means one or more related operations performed by a data processing system. Examples of a task include, but are not limited to, performing a download, performing a file transfer, performing a software installation, deploying of a virtual machine, performing a backup, performing data encryption, configuring software, and the like.

As defined herein, the term "crowd sourced statistics" means a compilation of statistical data contributed, at least in part, by a large number (e.g., over 100, over 1,000, over 10,000, over 100,000, over 1,000,000 or the like) of disparate data processing systems operated by respective people who are not employees or contractors of an entity (e.g., business or organization) for which the statistical data is gathered.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

FIG. 1 is a block diagram illustrating an example of a network data processing system 100. The network data processing system 100 contains at least one communication network 110. The communication network 110 is the medium used to provide communications links between various devices and data processing systems connected together within network data processing system 100. The communication network 110 may include connections, such as wire, wireless communication links, or fiber optic cables. The communication network 110 may be implemented as, or include, any of a variety of different communication technologies such as a Wide Area Network (WAN), a Local Area Network (LAN), a wireless network, a mobile or cellular network, a Virtual Private Network (VPN), the Internet, the Public Switched Telephone Network (PSTN), or the like.

The network data processing system 100 also can include a task progress prediction system 120 and a plurality of data processing systems 130, 132, 134, 136, 140 coupled to the communication network 110. The task progress prediction system 120 may be implemented as one or more data processing systems (e.g., servers), each including at least one processor and memory. The task progress prediction system 120 may include, or otherwise couple to, a data storage 125. The data storage 125 can be implemented as one or more data tables, for example within a database, stored to a computer readable storage medium contained within, or otherwise communicatively linked to, the task progress prediction system 120.

Each data processing system 130-140 comprises at least one processor and memory. Examples of a data processing system 130-140 include, but are not limited to, a server, a workstation, a desktop computer, a mobile computer, a laptop computer, a netbook computer, a tablet computer, a smart phone, a digital personal assistant, a smart watch, smart glasses, a gaming device, a set-top box, a network appliance, and the like.

In operation, each of the data processing systems 130-136 can perform various tasks. While performing the tasks, each of the data processing systems 130-136 can monitor the respective performance of a task performed by the respective data processing system 130-136 and generate corresponding data (e.g., parameters). For instance, each of the data processing systems 130-136 can identify a respective task and generate corresponding data, identify a type of task and/or operations performed by the task and generate corresponding data, monitor the duration of time it took to complete the task and generate corresponding data, monitor respective durations time it took to perform operations of the task and generate corresponding data, and the like. Each of the data processing systems 130-136 can store the generated data generated by the respective data processing system 130-136 to respective memory included in, or coupled to, the data processing system 130-136.

Responsive to a task being completed, each data processing systems 130-136 that performed a respective task can conglomerate the data related to the task with additional data pertaining to hardware comprised by the respective data processing system 130-136 and software executed by the respective data processing system 130-136 (collectively referred to as a hardware/software environment). Such additional data can indicate a type of operating system executed by the data processing system 130-136 that provided a computing environment on the data processing system 130-136 in which the task was performed, a version of the operating system, whether the operating system is virtualized and, if so, a type of virtualization system (e.g., a type of virtual machine used). The additional data also can indicate types of hardware used by, or otherwise available to, the data processing system 130-136 to perform the task, a level of bandwidth used by, or available to, the data processing system 130-136 to perform the task, other software installed and/or executing on the data processing systems 130-136 that is unrelated to the task, a level of resources of the data processing system 130-136 used to perform the task, a level of resources of the data processing system 130-136 used by other software while the task was being performed, a total of level of resources available to the data processing system 130-136, and the like.

The types of hardware used by the data processing system 130-136 can include, for example, a type of processor, a particular processor model number, an operating frequency of the processor, a number of cores provided by the processor, a number of threads provided by the processor, and the like. The types of hardware used by the data processing system 130-136 also can include, for instance, an amount of local memory (e.g., random access memory (RAM)), a level of performance of the local memory (e.g., frequency), an amount of bulk storage (e.g., hard disk drive (HDD) space or solid state drive (SSD) space), a level of performance of the bulk storage (e.g., sequential and/or random read/write bandwidth or operations per second), etc.

Responsive to a data processing system 130-136 conglomerating the data, the data processing system 130-136 can share the conglomerated data with the task progress prediction system 120 as statistical task data 150. For instance, the data processing system 130-136 can communicate the statistical task data 150 to the task progress prediction system 120. The task progress prediction system 120 can store statistical task data 150 received from each of the plurality of data processing systems 130-136 to the data storage 125. For example, the task progress prediction system 120 can add the statistical task data 150 to a compilation of crowd sourced statistics 155. In one aspect of the present arrangements, the data processing systems 130-136 can anonymously communicate the statistical task data 150 to the task progress prediction system 120 for inclusion in the crowd sourced statistics 155, though this need not be the case.

The task progress prediction system 120 can be owned and/or operated by a software vendor that provides software used by the data processing systems 130-136 and to be used by the data processing system 140, or another entity that provides statistical task data services. For example, a software vendor can have an account with such entity to provide such services to customers of the software vendor. Further, the services provided by the task progress prediction system can be delivered as part of an execution runtime or as a service.

The task progress prediction system 120 can store the statistical task data 150 in or more data tables including fields a plurality of fields. Example of such fields can include, but are not limited to, fields for indicating particular tasks, the type of the tasks, operations performed by the tasks, time entries durations of time experience to complete the tasks and/or operations performed by the tasks, and various fields for the additional data.

In one non-limiting arrangement, the task progress prediction system 120 can process the crowd sourced statistics 155 to generate progress profiles 160. In illustration, the task progress prediction system 120 can consolidate crowd sourced statistics 155 pertaining to a particular task or a particular type of task that was performed on a plurality of the data processing systems 130-136 having the same or similar hardware/software environments. In illustration, the task progress prediction system 120 can consolidate such crowd sourced statistics 155 into a progress profile 160 generated for that task or type of task in that type of hardware/software environment. The task progress prediction system 120 can store the progress profile 160 to the data storage 125. As the task progress prediction system 120 receives additional statistical task data 150 from additional data processing systems and adds such statistical task data 150 to the crowd sourced statistics 155, the task progress prediction system 120 can update corresponding progress profiles 160, in real time, by consolidating the further statistical task data 150 into the progress profiles 160.

In one arrangement, to consolidate crowd sourced statistics 155 into a respective progress profile 160 for a task or type of task in particular type of hardware/software environment, the task progress prediction system 120 can identify corresponding data records for the crowd sourced statistics 155 including duration of time data and determine, for each type of duration of time data, a standard deviation. The task progress prediction system 120 can disregard duration of time data that does not fall within a particular number of standard deviations. For instance, the task progress prediction system 120 can disregard duration of time data that fall outside of one standard deviation for that type of duration of time data. For each type of duration of time data, the task progress prediction system 120 can compute an average duration of time from corresponding duration of time data that is not disregarded (e.g., duration of time data that falls within the particular number of standard deviations). The task progress prediction system 120 can include in the progress profile 160 the computed average durations of time. In illustration, the task progress prediction system 120 can include in the progress profile 160 an average duration of time to complete the task and, for each operation performed by the task, a corresponding average duration of time to complete the operation. In addition, the task progress prediction system 120 can include in the progress profile 160 an average level of hardware and/or network resources used to perform the task and/or operations of the task, as well as information related to a typical software environment in which the task is performed.

At some time the data processing system 140 may initiate a task, for example automatically or at the behest of a user. The data processing system 140 can detect the task being initiated. Responsive to detecting the task being initiated, the data processing system 140 can access from the task progress prediction system 120 a progress profile 170 corresponding to the task and the hardware/software environment in which the task is initiated. In illustration, the data processing system 140 can communicate a request (e.g., an HTTP request) to the task progress prediction system 120.

The request can indicate various parameters. The parameters can indicate the task that is initiated and/or the type of task and the hardware/software environment of the data processing system 140. For example, the parameters can indicate the type of operating system providing a computing environment on the data processing system 140 in which the task is initiated, a version of the operating system, whether the operating system is virtualized and, if so, a type of virtualization system (e.g., a type of virtual machine used), other software installed and/or executing on the data processing system 140, the types of hardware used by the data processing system 140, and the like. In an arrangement in which the task performs operations involving communication of data over a communication network, such as the communication network 110, the parameters also can indicate the amount of bandwidth available to the data processing system 140 via the communication network 110.

In one arrangement, responsive to receiving the request from the data processing system 140, the task progress prediction system 120 can automatically parse the parameters from the request, generate a query including the parameters, and initiate the query to retrieve from the data storage 125 a progress profile 170, from among the progress profiles 160, corresponding to the task and the hardware/software environment indicated by the parameters parsed from the request. The progress profile 170 can indicate a duration of time to complete the task, as well as durations of time to complete various operations of the task and other data, in the software/hardware environment of the data processing system 140. The task progress prediction system 120 can respond to the request by communicating to the data processing system 140 the progress profile 170.

In an arrangement in which the task progress prediction system 120 does not generate and/or update the progress profiles 160 as the task progress prediction system 120 receives the statistical task data 150, responsive to receiving the request from the data processing system 140, the task progress prediction system 120 can automatically generate the progress profile 170 for the data processing system 140 and communicate the progress profile 170 to the data processing system. The task progress prediction system 120 can generate the progress profile 170 in a manner to that previously described. In this case, the task progress prediction system 120 can query the crowd sourced statistics 155 using parameters parsed from the HTTP request, and generate the progress profile 170 using data retrieved by the query.

Regardless of how or when the progress profile 170 is generated, because the progress profile 170 includes duration of time data related to performing the task on other data processing systems 130-136 that have hardware/software environments similar to the hardware/software environment of the data processing system 140, the progress profile 170 can accurately approximate the duration of time it will take to perform the task, and various operations of the task, on the data processing system 140. The data processing system 140 can present to a user of the data processing system 140 a progress bar indicating progress at performing the task, and reiteratively update the progress bar to accurately reflect the progress by monitoring progression of the task and processing the progress profile 170.

Figure 2:
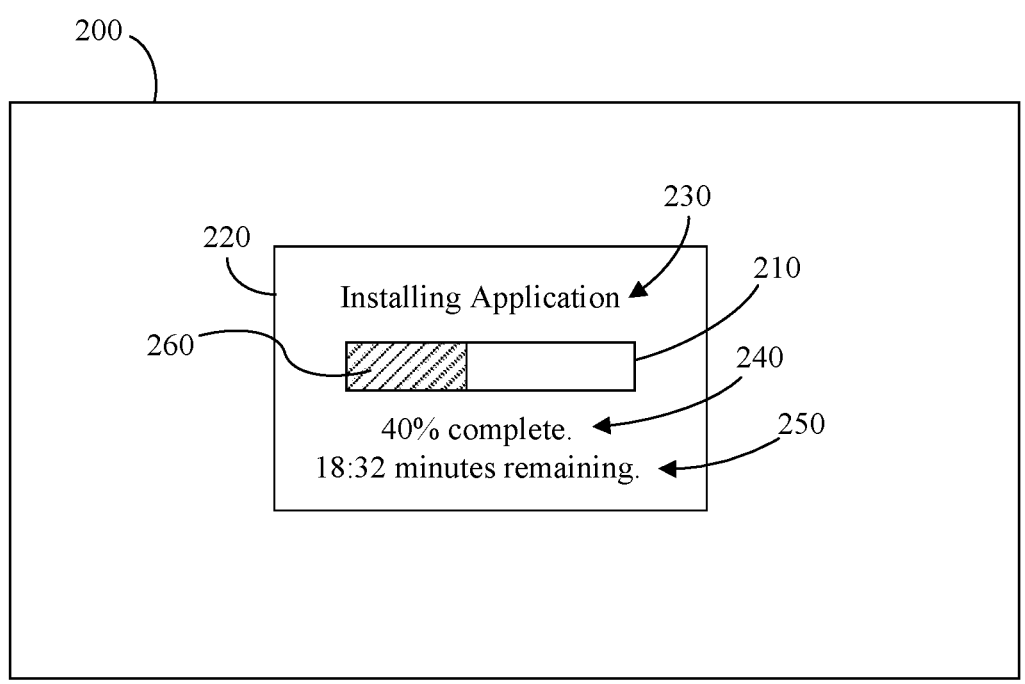
FIG. 2 depicts a pictorial diagram illustrating a progress bar presented in a user interface.

FIG. 2 depicts a pictorial diagram illustrating a progress bar 210 presented in a user interface 200 of a data processing system, such as the data processing system 140. The user interface 200 can be presented by a display integrated with or coupled to the data processing system 140. Responsive to the data processing system 140 detecting a task being initiated by the data processing system 140, the data processing system 140 can access the progress profile 170, for example as previously described, and present the progress bar 210 on the display. In illustration, the data processing system 140 can present the progress bar 210 in a window 220. The window 220 also can include an indicator 230 (e.g., text or an icon) identifying the task that is initiated, an indicator 240 that indicates a level of completion of the task, and an indicator 250 that indicates an amount of time remaining for the task to be complete.

In a further arrangement, the data processing system 140 also can present other indicators (not shown) in the window, for example indicators that indicate processor activity, bulk storage device activity, network activity, etc. Such an arrangement can be useful to indicate to a user that the data processing system 140 is continuing to perform various processes. In one aspect, the data processing system can present a composite bar (not shown) that includes the progress bar 210, a second progress bar indicating processor activity, a third progress bar indicating bulk storage device activity, a fourth progress bar indicating network activity, and/or the like. In another arrangement, the composite bar can include the progress bar 210 with an activity indicator indicating processor activity, an activity indicator indicating bulk storage device activity, an activity indicator indicating network activity, and/or the like.

In one arrangement, the data processing system 140 can display the progress bar 210 as a default progress bar, for example without another progress bar being displayed. In another arrangement, the data processing system 140 can display the progress bar 210 and another progress bar updated in a conventional manner, for example in the window 220 or in separate windows. Thus, programming changes to existing software are not necessarily needed to disable a progress bar already programmed into the existing software. If the progress profile 170 is not available, for example due to inability of the data processing system to connect to the task progress prediction system 120 or insufficient crowd sourced statistics 155 to generate the progress profile 170, the data processing system 140 can present a default progress bar in lieu of the progress bar 210.

The data processing system 140 can monitor progression of the task being performed, including progression of operations being performed by the task. Based on progression of the performance of the task and/or operations, and processing the progress profile 170, the data processing system 140 can reiteratively update the progress bar 210 to indicate a present level of completion of the task by the data processing system 140. For example, the data processing system 140 can update a moving indicator 260 of the progress bar. Further, the data processing system 140 can reiteratively update the indicator 240 to indicate the present level of completion of the task, and reiteratively update the indicator 250 to indicate a presently expected amount of time remaining for the task to be complete.

In a simple example, assume that a task performs a single operation, for example a file download. The progress profile 170 can include data indicating an expected amount of time for the file download to be completed in a hardware/software environment similar to that of the data processing system 140, and the progress profile 170 can indicate parameters of such a hardware/software environment, such as a typical amount of memory, processor utilization and network bandwidth available to perform the task. As the task executes, the data processing system 140 can monitor the amount of time that has passed since the task was initiated, and reiteratively update the indicators 240-260 to indicate the level of completion based on the amount of time that has passed.

In some cases, however, the hardware/software environment of the data processing system 140 may not precisely match the hardware/software environment parameters indicated by the progress profile 170. For example, the amount of network bandwidth presently available to the data processing system may be less than the amount of available network bandwidth indicated in the progress profile 170. The data processing system 140 can compare the presently available bandwidth to the available network bandwidth indicated in the progress profile 170 and, based on that comparison, determine a compensation factor. For example, if the amount of available bandwidth indicated in the progress profile 170 is double the presently available network bandwidth, the data processing system 140 can determine the compensation factor to be 2. The data processing system 140 can multiply the expected amount of time for the file download to be completed by the compensation factor to determine a better approximation of the time required for the file download to be completed, and update one or more of the indicators 240-260 accordingly. Further, the data processing system 140 can continue monitoring the hardware/software environment to detect changes in available resources. Responsive to detecting any such changes, the data processing system 140 can determine another compensation factor and use that compensation factor to again update the indicators 240-260.

In a more complex example, assume that a task includes five different operations. The progress profile 170 can include data indicating an expected amount of time for the task to be completed in a hardware/software environment similar to that of the data processing system 140. Also, the progress profile 170 can include data indicating each of the operations and, for each of the operations, an expected amount of time for the operation to be completed in a hardware/software environment similar to that of the data processing system 140. The progress profile 170 also can indicate a sequence in which the operations are performed and/or indicate operations that are performed simultaneously. The progress profile 170 also can indicate a typical level of resources available to perform the task in similar hardware/software environments, for instance a typical amount of memory, processor utilization and/or network bandwidth available to perform the task.

For simplicity, assume for this example that each operation is expected to take five minutes to complete. As the task begins, the data processing system 140 can monitor execution of a first operation and reiteratively update the indicators 240-260 to indicate the level of completion based on the amount of time that has passed since the first operation started. Again, the data processing system 140 can update the indicators 240-260 based on detected changes in the hardware/software environment. Further, the data processing system 140 can monitor execution of the first operation to determine when the first operation completes, and the actual amount of time it took the operation to complete. The data processing system 140 can compare the actual amount of time it took for the first operation to complete to the expected amount of time, and determine a compensation factor and user that compensation factor to update the indicators 240-260. For example, if the actual time was four minutes and thirty seconds, the data processing system 140 can determine the compensation factor to be 0.9. Because the data processing system 140 was able to perform the first operation faster than expected, it can be assumed that the data processing system 140 will perform the other operations faster as well. Thus, the data processing system 140 can update the indicators 240-260 based on the compensation factor to provide a more accurate indication of the completion of the task and a more accurate indication when the task is expected to complete.

In one arrangement, the data processing system 140 can display an alert in the window 220 or elsewhere in the user interface responsive to the data processing system 140 detecting the status of completion of performing the task deviating from an expected status of completion by more than a threshold value (e.g., a pre-determined threshold value). For example, if performance of the task is proceeding at less than half of an expected rate of performance, the data processing system 140 can present the alert. The data processing system 140 also can evaluate the various resources that are available to perform the task, and identifying any resources having an availability that is significantly less than a level of availability indicated in the progress profile 170. For example, if the network bandwidth drops to less than half of the network bandwidth indicated in the progress profile 170, the data processing system 140 can identify such can condition. Further, the data processing system 140 can indicate the condition in the alert. Thus, a user of the data processing system 140 will be aware of why the task is not proceeding as expected.

Responsive to completion of the task, the data processing system 140 can communicate statistical task data 150 to the task progress prediction system 120, for example as previously described with respect to the data processing systems 130-136. In addition to the previously described data included in statistical task data 150, the data processing system 140 also can include data indicating the accuracy of the expected amount of time for the task to be performed in comparison to the actual amount of time it took for the task to be performed. The task progress prediction system 120 can use such data to update the progress profiles 160, which can improve the accuracy of progress profiles 160 provided to other data processing systems.

FIG. 3 is a flow chart illustrating an example of a method 300 of presenting and reiteratively updating a progress bar. At step 305, a first data processing system comprising at least one processor can detect a task be imitated by the first data processing system. At step 310, responsive to detecting the task being initiated, the first data processing system can access, via a communication network, a progress profile at least indicating a duration of time expected for the task to be performed, wherein the progress profile is generated based on crowd sourced statistics indicating respective durations of time to perform the task by a plurality of other data processing systems that performed the task and that shared the respective durations of time with a second data processing system for inclusion in the crowd sourced statistics. At step 315, the first data processing system can present a progress bar on a display. At step 320, the first data processing system can indicate a status of completion of performing the task by the first data processing system by reiteratively updating the progress bar, wherein the status of completion of performing the task by the first data processing system is determined based on the duration of time expected for the task to be performed as indicated in the progress profile and an amount of time that has elapsed since the task was initiated or a number of processes to performed by the task that are completed.

Figure 4:
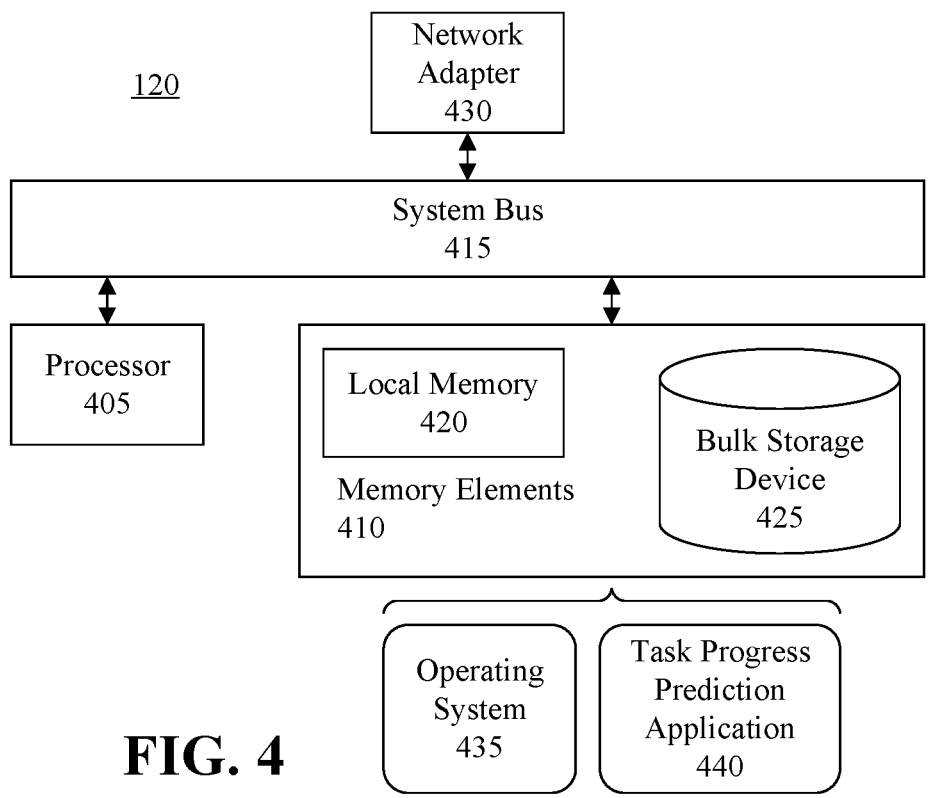
FIG. 4 is a block diagram illustrating example architecture for a task progress prediction system.

FIG. 4 is a block diagram illustrating example architecture for the task progress prediction system 120 of FIG. 1. The task progress prediction system 120 can include at least one processor 405 (e.g., a central processing unit) coupled to memory elements 410 through a system bus 415 or other suitable circuitry. As such, the task progress prediction system 120 can store program code within the memory elements 410. The processor 405 can execute the program code accessed from the memory elements 410 via the system bus 415. It should be appreciated that the task progress prediction system 120 can be implemented in the form of any system including a processor and memory that is capable of performing the functions and/or operations described within this specification that are performed by the task progress prediction system 120. For example, the task progress prediction system 120 can be implemented as one or more hardware servers.

The memory elements 410 can include one or more physical memory devices such as, for example, local memory 420 and one or more bulk storage devices 425. Local memory 420 refers to random access memory (RAM) or other non-persistent memory device(s) generally used during actual execution of the program code. The bulk storage device(s) 425 can be implemented as a hard disk drive (HDD), solid state drive (SSD), or other persistent data storage device. The task progress prediction system 120 also can include one or more cache memories (not shown) that provide temporary storage of at least some program code in order to reduce the number of times program code must be retrieved from the bulk storage device 425 during execution.

One or more network adapters 430 can be coupled to task progress prediction system 120 to enable the task progress prediction system 120 to become coupled to other systems, computer systems, remote printers, and/or remote storage devices through intervening private or public networks. Modems, cable modems, transceivers, and Ethernet cards are examples of different types of network adapters 430 that can be used with the task progress prediction system 120.

As pictured in FIG. 4, the memory elements 410 can store components of the task progress prediction system 120, for example an operating system 435 and a task progress prediction application 440. Being implemented in the form of executable program code, the operating system 435 and the task progress prediction application 440 can be executed by the processor 405. For example, the processor 405 can execute the task progress prediction application 440 within a computing environment provided by the operating system 435 in order to perform the processes described herein that are performed by the task progress prediction system 120. As such, the operating system 435 and the task progress prediction application 440 can be considered part of the task progress prediction system 120. Moreover, the operating system 435 and the task progress prediction application 440 are functional data structures that impart functionality when employed as part of the task progress prediction system 120.

Figure 5:
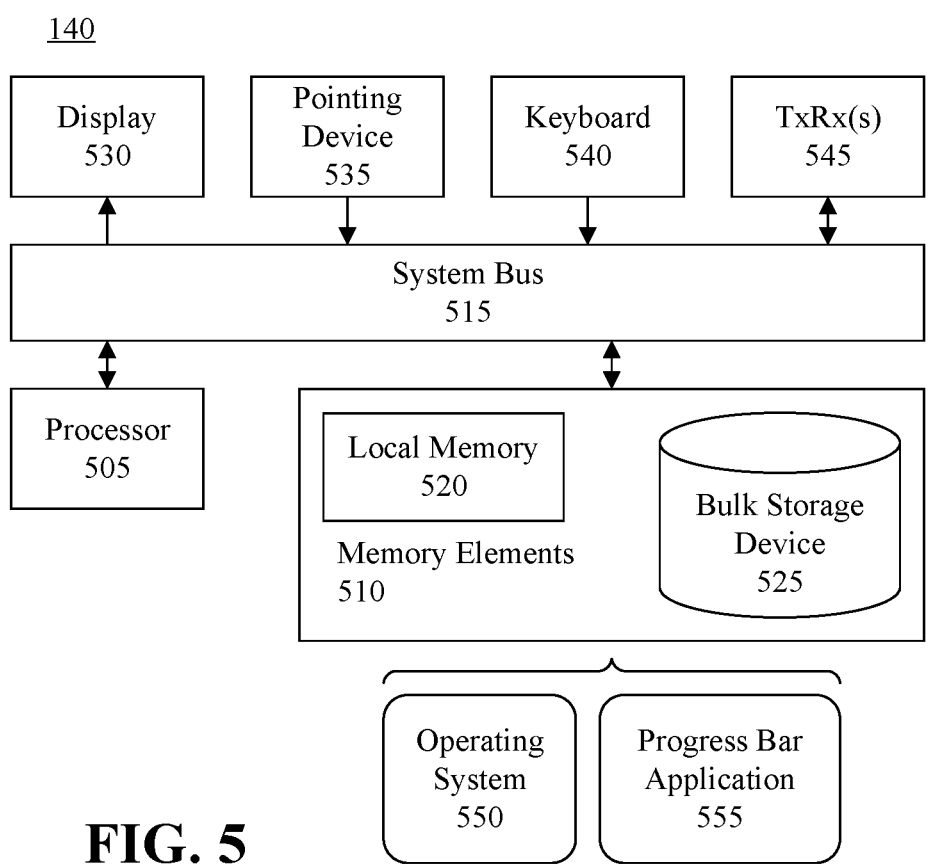
FIG. 5 is a block diagram illustrating example architecture for a data processing system.

FIG. 5 is a block diagram illustrating example architecture for the data processing system 140 of FIG. 1. The data processing system 140 can include at least one processor 505 (e.g., a central processing unit) coupled to memory elements 510 through a system bus 515 or other suitable circuitry. As such, the data processing system 140 can store program code within the memory elements 510. The processor 505 can execute the program code accessed from the memory elements 510 via the system bus 515. It should be appreciated that the data processing system 140 can be implemented in the form of any system including a processor and memory that is capable of performing the functions and/or operations described within this specification that are performed by the data processing system 140.

The memory elements 510 can include one or more physical memory devices such as, for example, local memory 520 and one or more bulk storage devices 525. The data processing system 140 also can include one or more cache memories (not shown) that provide temporary storage of at least some program code in order to reduce the number of times program code must be retrieved from the bulk storage device 525 during execution.

Input/output (I/O) devices such as a display 530, a pointing device 535 and, optionally, a keyboard 540 can be coupled to the data processing system 140. The I/O devices can be coupled to the data processing system 140 either directly or through intervening I/O controllers. For example, the display 530 can be coupled to the data processing system 140 via a graphics processing unit (GPU), which may be a component of the processor 505 or a discrete device. One or more transceivers 545 also can be coupled to data processing system 140 to enable the data processing system 140 to become coupled to other systems, computer systems, remote printers, and/or remote storage devices through intervening private or public networks. Modems, cable modems, transceivers, and Ethernet cards are examples of different types of network adapters 330 that can be used with the data processing system 140.

As pictured in FIG. 5, the memory elements 510 can store the components of the data processing system 140, for example an operating system 550 and a progress bar application 555. Being implemented in the form of executable program code, the operating system 550 and the progress bar application 555 can be executed by the processor 505. For example, the processor 505 can execute the progress bar application 555 within a computing environment provided by the operating system 550 in order to perform the processes described herein that are performed by the data processing system 140 to access a progress profile, present progress bar and communicate data to the task progress prediction system 120. As such, the operating system 550 and the progress bar application 555 can be considered part of the data processing system 140. Moreover, the operating system 550 and the progress bar application 555 are functional data structures that impart functionality when employed as part of the data processing system 140.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving from a first data processing system first statistical task data, the first statistical task data comprising at least one statistic indicating a first duration of time to perform a task by the first data processing system that performed the task;
   receiving from a second data processing system second statistical task data, the second statistical task data comprising at least one statistic indicating a second duration of time to perform the task by the second data processing system that performed the task;
   updating, using a processor, a progress profile for the task by conglomerating the first statistical task data received from the first data processing system with at least the second statistical task data received from the second data processing system, the progress profile indicating the task, the first duration of time to perform the task by the first data processing system and at least the second duration of time to perform the task by the second data processing system;
   receiving a request from a third data processing system, the request indicating the task; and
   responsive to receiving the request from the third data processing system, communicating to the third data processing system the progress profile, wherein the third data processing system presents on a display a progress bar and indicates a status of completion of performing the task by the first data processing system by reiteratively updating the progress bar, wherein the status of completion of performing the task by the third data processing system is determined based on a duration of time expected for the task to be performed as indicated in the progress profile and an amount of time that has elapsed since the task was initiated.

2. The method of claim 1, wherein the first data processing system and at least the second data processing system have hardware similar to hardware comprised by the third data processing system, the method further comprising:
   receiving a request from the third data processing system, the request indicating a hardware environment of the third data processing system; and
   selecting the progress profile based on the hardware environment of the third data processing system indicated by the request.

3. The method of claim 2, wherein:
   the first data processing system and at least the second data processing system have a software environment similar to a software environment comprised by the third data processing system; and
   the request received from the third data processing system indicates the software environment of the third data processing system;
   the method further comprising:
   selecting the progress profile further based on the software environment of the third data processing system indicated by the request.

4. The method of claim 3, wherein:
   the first data processing system and at least the second data processing execute additional software unrelated to the task similar to additional software unrelated to the task executed by the third data processing system; and
   the request received from the third data processing system indicates the additional software unrelated to the task executed by the third data processing system;
   the method further comprising:
   selecting the progress profile further based on the additional software unrelated to the task executed by the third data processing system indicated by the request.

5. The method of claim 1, further comprising:
   receiving from the third data processing system, responsive to the third data processing system completing the task, third statistical task data indicating, at least, a duration of time taken for the task to be performed by the third data processing system and parameters indicating hardware comprised by the third data processing system.

6. The method of claim 5, wherein the third statistical task data further indicates software unrelated to the task executed by the third data processing system.

7. The method of claim 5, further comprising:
   conglomerating the third statistical task data with the first statistical task data and at least the second statistical task data in the progress profile for the task.

8. A system, comprising:
a processor programmed to initiate executable operations comprising:
receiving from a first data processing system first statistical task data, the first statistical task data comprising at least one statistic indicating a first duration of time to perform a task by the first data processing system that performed the task;
receiving from a second data processing system second statistical task data, the second statistical task data comprising at least one statistic indicating a second duration of time to perform the task by the second data processing system that performed the task;
updating a progress profile for the task by conglomerating the first statistical task data received from the first data processing system with at least the second statistical task data received from the second data processing system, the progress profile indicating the task, the first duration of time to perform the task by first data processing system and at least the second duration of time to perform the task by the second data processing system;
receiving a request from a third data processing system, the request indicating the task; and
responsive to receiving the request from the third data processing system, communicating to the third data processing system the progress profile, wherein the third data processing system presents on a display a progress bar and indicates a status of completion of performing the task by the first data processing system by reiteratively updating the progress bar, wherein the status of completion of performing the task by the third data processing system is determined based on a duration of time expected for the task to be performed as indicated in the progress profile and an amount of time that has elapsed since the task was initiated.

9. The system of claim 8, wherein the first data processing system and at least the second data processing system have hardware similar to hardware comprised by the third data processing system, the executable operations further comprising:
receiving a request from the third data processing system, the request indicating a hardware environment of the third data processing system; and
selecting the progress profile based on the hardware environment of the third data processing system indicated by the request.

10. The system of claim 9, wherein:
the first data processing system and at least the second data processing system have a software environment similar to a software environment comprised by the third data processing system; and
the request received from the third data processing system indicates the software environment of the third data processing system;
the executable operations further comprising:
selecting the progress profile further based on the software environment of the third data processing system indicated by the request.

11. The system of claim 10, wherein:
the first data processing system and at least the second data processing execute additional software unrelated to the task similar to additional software unrelated to the task executed by the third data processing system; and the request received from the third data processing system indicates the additional software unrelated to the task executed by the third data processing system;
the executable operations further comprising:
selecting the progress profile further based on the additional software unrelated to the task executed by the third data processing system indicated by the request.

12. The system of claim 8, the executable operations further comprising:
receiving from the third data processing system, responsive to the third data processing system completing the task, third statistical task data indicating, at least, a duration of time taken for the task to be performed by the third data processing system and parameters indicating hardware comprised by the third data processing system.

13. The system of claim 12, wherein the third statistical task data further indicates software unrelated to the task executed by the third data processing system.

14. The system of claim 12, the executable operations further comprising:
conglomerating the third statistical task data with the first statistical task data and at least the second statistical task data in the progress profile for the task.

15. A computer program product, comprising:
a computer readable storage medium having program code stored thereon, the program code executable by a data processing system to initiate operations including:
receiving from a first data processing system first statistical task data, the first statistical task data comprising at least one statistic indicating a first duration of time to perform a task by the first data processing system that performed the task;
receiving from a second data processing system second statistical task data, the second statistical task data comprising at least one statistic indicating a second duration of time to perform the task by the second data processing system that performed the task;
updating a progress profile for the task by conglomerating the first statistical task data received from the first data processing system with at least the second statistical task data received from the second data processing system, the progress profile indicating the task, the first duration of time to perform the task by first data processing system and at least the second duration of time to perform the task by the second data processing system;
receiving a request from a third data processing system, the request indicating the task; and
responsive to receiving the request from the third data processing system, communicating to the third data processing system the progress profile, wherein the third data processing system presents on a display a progress bar and indicates a status of completion of performing the task by the first data processing system by reiteratively updating the progress bar, wherein the status of completion of performing the task by the third data processing system is determined based on a duration of time expected for the task to be performed as indicated in the progress profile and an amount of time that has elapsed since the task was initiated.

16. The computer program product of claim 15, wherein the first data processing system and at least the second data processing system have hardware similar to hardware comprised by the third data processing system, the operations further comprising:

receiving a request from the third data processing system, the request indicating a hardware environment of the third data processing system; and selecting the progress profile based on the hardware environment of the third data processing system indicated by the request.

17. The computer program product of claim 16, wherein:

the first data processing system and at least the second data processing system have a software environment similar to a software environment comprised by the third data processing system; and the request received from the third data processing system indicates the software environment of the third data processing system;

the operations further comprising:

selecting the progress profile further based on the software environment of the third data processing system indicated by the request.

18. The computer program product of claim 17, wherein:

the first data processing system and at least the second data processing execute additional software unrelated to the task similar to additional software unrelated to the task executed by the third data processing system; and the request received from the third data processing system indicates the additional software unrelated to the task executed by the third data processing system;

the operations further comprising:

selecting the progress profile further based on the additional software unrelated to the task executed by the third data processing system indicated by the request.

19. The computer program product of claim 15, the operations further comprising:

receiving from the third data processing system, responsive to the third data processing system completing the task, third statistical task data indicating, at least, a duration of time taken for the task to be performed by the third data processing system and parameters indicating hardware comprised by the third data processing system.

20. The computer program product of claim 19, wherein the third statistical task data further indicates software unrelated to the task executed by the third data processing system.

* * * * *